US012508732B1

(12) United States Patent
Liu

(10) Patent No.: US 12,508,732 B1
(45) Date of Patent: Dec. 30, 2025

(54) PAPER CUTTING DEVICE HAVING A TAPE CUTTING ASSEMBLY

(71) Applicant: Yong Liu, Zhejiang (CN)

(72) Inventor: Yong Liu, Zhejiang (CN)

( * ) Notice: Subject to any disclaimer, the term of this patent is extended or adjusted under 35 U.S.C. 154(b) by 0 days.

(21) Appl. No.: 19/028,256

(22) Filed: Jan. 17, 2025

Related U.S. Application Data

(63) Continuation-in-part of application No. 18/963,667, filed on Nov. 28, 2024, and a continuation-in-part of application No. 18/797,836, filed on Aug. 8, 2024.

(30) Foreign Application Priority Data

Jan. 4, 2025 (CN) ......................... 202520015284.5

(51) Int. Cl.

*B65H 35/06* (2006.01)
*B26D 7/01* (2006.01)
*B26D 7/14* (2006.01)
*B26D 7/22* (2006.01)
*B65H 35/00* (2006.01)

(52) U.S. Cl.

CPC ............... *B26D 7/015* (2013.01); *B26D 7/14* (2013.01); *B26D 7/22* (2013.01); *B65H 35/0013* (2013.01); *B65H 35/06* (2013.01)

(58) Field of Classification Search

CPC ........... B26B 27/00; B26B 3/08; B26B 29/06; B26D 2001/006; B26D 1/045; B26D 2210/11; B65H 2701/5112; B65H 35/002; B65H 2301/51532; B65H 2701/1944; B65H 2301/515123; B65H 2301/515; B65H 2301/51512; B65H 2301/515126

USPC ......... 30/278, 280, 294, 289, 298.4; 83/651, 83/614, 635, 646; D8/14, 48, 98; D18/34.3, 34.8; 225/7

See application file for complete search history.

(56) References Cited

U.S. PATENT DOCUMENTS 2,290,223 A * 7/1942 Black ....................... D06H 7/02 83/567
3,991,923 A * 11/1976 Nishikawa ......... B65H 35/0026 225/21
4,358,328 A * 11/1982 Pearson ................ B29C 66/742 225/65
5,307,717 A * 5/1994 Winston ............... B65H 35/002 83/522.11
5,445,703 A * 8/1995 Steeves ................ B65H 35/004 156/577
5,478,000 A * 12/1995 Jensen ............... B65H 35/0066 83/337

(Continued)

FOREIGN PATENT DOCUMENTS

DE 202012006366 U1 * 10/2013 ............... B26B 3/08
GB 2528171 A * 1/2016 ............. B65B 67/08

*Primary Examiner* — Ghassem Alie

(57) ABSTRACT

A paper cutting device with an attached tape cutting device includes a paper separation housing, a paper cutting structure and a tape cutting assembly. The paper separation housing has an axially through and open first end and a second end. The paper cutting structure includes a slit and a blade, the slit extends axially from the first end to the second end of the paper separation housing, and the blade is arranged in the slit and mounted on the housing. The tape cutting assembly is fixedly mounted on the outer wall of the housing and is configured for putting on a tape roll and cutting the tape.

20 Claims, 13 Drawing Sheets

(56) References Cited

U.S. PATENT DOCUMENTS

| | | | | |
|---|---|---|---|---|
| 7,152,650 | B2 * | 12/2006 | Van Tyle | B65H 35/0033<br>156/577 |
| 8,065,944 | B1 * | 11/2011 | Speas, Jr. | B26D 1/02<br>83/485 |
| 11,717,977 | B1 * | 8/2023 | Xie | B26B 3/08<br>30/278 |
| 2023/0039376 | A1 | 2/2023 | Moroyama | |
| 2023/0057453 | A1 * | 2/2023 | North | B65H 35/06 |
| 2024/0042456 | A1 | 2/2024 | Wang | |
| 2024/0227216 | A1 | 7/2024 | Yaguchi | |

* cited by examiner

B-B

PAPER CUTTING DEVICE HAVING A TAPE CUTTING ASSEMBLY

CROSS REFERENCE TO RELATED APPLICATIONS

This application claims priority benefits to Chinese Patent Application No. 2025200152845, filed on Jan. 4, 2025, and is a continuation-in-part of U.S. patent application Ser. No. 18/963,667 filed on Nov. 28, 2024, which is a continuation-in-part of U.S. patent application Ser. No. 18/797,836 filed on Aug. 8, 2024, which are hereby incorporated by reference in their entirety.

TECHNICAL FIELD

The present disclosure relates to the technical fields of paper cutting equipment, and in particular, to a paper cutting device with a protection function and an attached tape cutting component.

BACKGROUND

In modern office and daily life, paper and tape are commonly used materials. To facilitate their use, there are various knifes and tape dispensers available on the market. Most existing tools have a single function, such as being specifically designed for cutting paper or tape, and cannot meet the user's need to handle both paper and tape simultaneously.

SUMMARY

The embodiments of the present disclosure provide a paper cutting device with a tape cutting assembly, which solves at least one of the above problems.

A first aspect of the embodiments of the present disclosure provides a paper cutting device with a tape cutting assembly, which includes a housing. The housing includes a paper separation housing. The paper separation housing has a first end and a second end. A side wall of the paper separation housing defines a cavity that may accommodate a paper roll, ensuring that the paper may be smoothly unfolded during the cutting process. The paper roll is firmly placed in the cavity, reducing the possibility of shaking or deviation, thereby improving cutting stability and accuracy. An outer wall from the first end to the second end defines a length of the paper separation housing, making the entire device compact and easy to hold, and enhancing operational stability. The paper cutting device provide sufficient space to accommodate the paper roll, but also ensures that the overall structure is sturdy, preventing deformation or displacement due to frequent use, thereby extending the device's service life. A paper cutting structure is arranged on the housing, and the paper cutting structure includes a slit and a knife. The slit extends axially from the first end to the second end of the paper separation housing, ensuring that the paper enters the cutting area along a predetermined path. The slit serves as a passage for paper to enter the cutting range of the knife according to the predetermined path. It not only improves cutting accuracy, prevents the paper from deviating, enhances cutting accuracy and consistency, and reduces paper waste. The knife is arranged in the slit and installed on the housing. The paper on the paper roll may enter the slit. The knife is configured to cut the paper entering from the slit. The tape cutting assembly is fixedly installed on the outer wall of the housing and is configured to arrange a tape roll and cut a tape. Integrating the paper cutting and tape cutting functions in one device simplifies a user's operations and improves work efficiency by allowing the user to handle multiple tasks without frequently changing tools, which is particularly suitable for scenarios where paper and tape need to be processed at the same time.

In some embodiments, the tape cutting assembly includes a tape sleeve shaft connected to the outer wall of the paper separation housing, the tape sleeve shaft is optionally equipped with a tape roll; the tape sleeve shaft allows the tape roll to rotate smoothly to pull out the tape; a blade fixing member is connected to the outer wall of the paper separation housing and is arranged on a same side of the tape sleeve shaft. A saw blade is installed on the blade fixing member, and the saw blade is configured to cut the tape pulled out from the tape roll.

Integrating the paper cutting and tape cutting functions into one device simplifies the user's operation process and improves work efficiency. Users may handle paper and tape at the same time without frequently changing tools, which is particularly suitable for office and home environments where paper and tape need to be cut at the same time. The operation mechanism is optimized so that users may easily and intuitively complete the cutting action, reducing operational steps and improving convenience of use. The tape cutting assembly allows users to complete the cutting by simply pressing the sliding member without additional steps, which improves the simplicity and efficiency of operation. The gap between the paper pressing plate and the slit helps control the paper introduction path and reduce paper deviation. The paper pressing plate bends the paper into an arc surface, so that the paper passing through the slit has a greater stiffness and tension before reaching the blade of the knife, improving cutting stability and quality.

BRIEF DESCRIPTION OF THE DRAWINGS

The drawings constituting a part of the present disclosure are configured to provide a further understanding of the present disclosure. The embodiments of the present disclosure and their descriptions are used for explaining and do not constitute an improper limitation on the present disclosure.

DETAILED WAY

Figure 1:
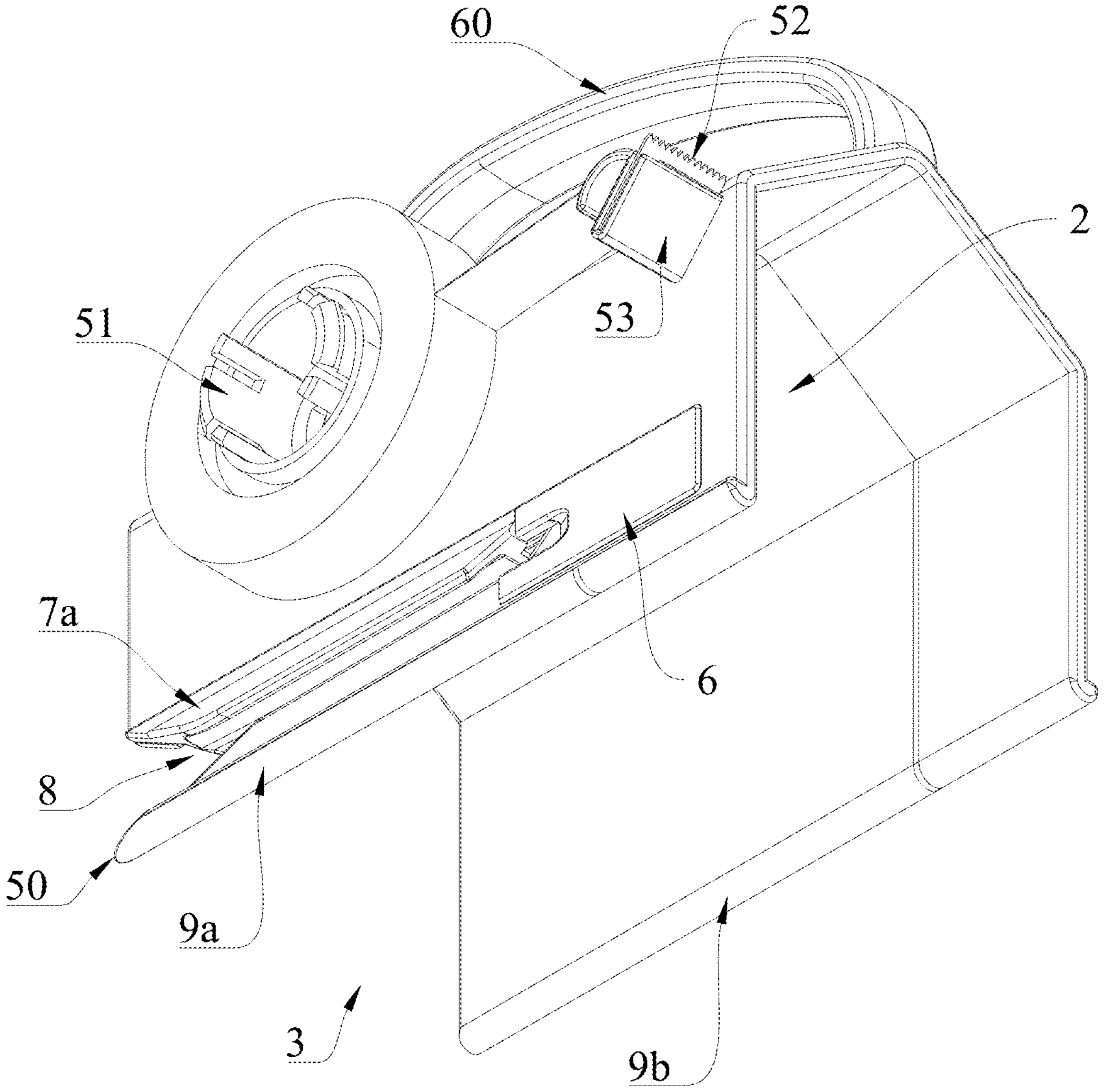
FIG. 1 is a perspective view of a paper cutting device in which a tape is installed on an attached tape cutting assembly in accordance with the embodiments of the present disclosure.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of some embodiments may be used according to another embodiment to produce yet another embodiment. Therefore, it is intended that the present disclosure includes such modifications and variations within the scope of the appended claims and their equivalents.

In the description of the present disclosure, the terms “longitudinal”, “lateral”, “upper”, “lower”, “front”, “back”, “left”, “right”, “vertical”, “horizontal”, “top”, “bottom” and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms “connected”, “connecting” and “arranged” used in the present disclosure should be understood in a broad sense. For example, it may be a fixed connection or a detachable connection; it may be directly connected or indirectly connected through an intermediate component; it may further be a wired electrical junction, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms “first”, “second” and “third” are used interchangeably to distinguish one component from another and are not intended to indicate the position or importance of individual components.

As shown in FIGS. 1 to 13, according to some embodiments of the present disclosure, a paper cutting device with a tape cutting assembly is provided. The paper cutting device includes a housing. The housing includes a paper separation housing 1 and a blade housing 6. The paper separation housing 1 has a first end 10 and a second end 20. The first end 10 and the second end 20 are axially through and open. An inner wall of the paper separation housing 1 defines a cavity 2 that may accommodate an elongated paper roll 80. The cavity 2 ensures that the paper may be smoothly unfolded during the cutting process. The paper roll is firmly placed in the cavity, reducing the possibility of wobbling or deviation, and improving cutting stability and accuracy. An outer wall of the paper separation housing 1 extending from the first end 10 to the second end 20 defines a length of the paper separation housing 1. The cavity 2 provides sufficient space to accommodate the paper roll 80, making the device compact and easy to hold, and enhancing the stability of operation. In addition, the paper cutting device prevents deformation or displacement due to frequent use, extending its service life. The paper cutting structure is arranged on the housing, the paper cutting structure includes a slit 8 and a blade 4, and a position of a blade edge 44 of the blade 4 corresponds to the entrance of the slit 8. The slit 8 extends axially from the first end 10 toward the second end 20 of the paper separation housing 1, guiding the paper to enter the cutting area along a predetermined path to ensure cutting accuracy and consistency. The axially extending slit 8 prevents the paper 70 from shifting during cutting, further enhancing the cutting effect and reducing paper. The blade 4 is arranged in the slit 8 of the housing, avoiding the risk of the blade being exposed and reducing the possibility of accidental contact, thus improving safety during use. The paper 70 on the paper roll 80 may be optionally fed into the slit 8, and the blade 4 is configured to cut the paper entering through the slit 8. It ensures that the position and angle of the blade are consistent each time the cutting is performed, providing stable cutting force and guaranteeing cutting quality of the cutting. It is particularly suitable for paper of varying thicknesses and materials. The tape cutting assembly is fixedly installed on the outer wall of the housing and is configured to receive a tape roll 90 and cut a tape 91. The tape cutting function integrated into the paper cutting device allows a user to handle paper and tape at the same time without frequently changing tools, significantly improving work efficiency. Paper cutting and tape cutting may be easily completed on the same device, reducing troublesome operating steps and tool switching, thus enhancing convenience and efficiency.

In some embodiments, as shown in FIG. 1 to FIG. 6, the paper cutting device with a tape cutting assembly further includes a paper pressing plate 7, which continuously assists in positioning and pressing down the paper 70 being fed into the slit 8, ensuring that the paper 70 remains flat and fixed as it enters the slit 8. This reduces the possibility of shaking or shifting of the paper 70, thereby improving cutting precision. When the paper 70 is bent, a more concentrated cutting point is formed at the blade 4, enhancing the cutting force. This concentration of force allows the blade 4 to penetrate the paper 70 more easily, ensuring smooth and consistent cutting, especially suitable for thicker or special paper materials.

In some embodiments, as shown in FIG. 1 to FIG. 6, the paper pressing plate 7 includes an outer paper pressing plate **7*a* and an inner paper pressing plate 7*b*. The outer paper pressing plate 7*a* and the inner paper pressing plate 7*b* are respectively arranged on an inner side and an outer side of the paper separation housing 1. The outer paper pressing plate 7*a* and the inner paper pressing plate 7*b* are both arranged proximal to the slit 8 and connected to the paper separation housing 1. The outer paper pressing plate 7***a* and the inner paper pressing plate 7*b* both covers at least a part of the slit 8. The paper 70 is bent downward on both sides of the slit 8 when entering the slit 8, which increases the stiffness and tension of the paper 70 when it is approaching to the blade 4. The paper 70 is more compact and flatter when it reaches the blade 4, reducing cutting errors caused by relaxation or shaking of the paper 70, thereby improving the cutting accuracy and quality.

In some embodiments, as shown in FIG. 1 to FIG. 3, FIG. 5 to FIG. 6, and FIG. 13, the tape cutting assembly includes a tape sleeve shaft 51, which is connected to the outer wall of the paper separation housing 1. The tape sleeve shaft 51 is optionally equipped with a tape roll 90; the tape sleeve shaft 51 allows the tape roll 90 to rotate smoothly. This ensures that a tape 91 may be pulled out smoothly, avoids inconveniences caused by jamming or excessive resistance, and improves user experience.

Figure 5:
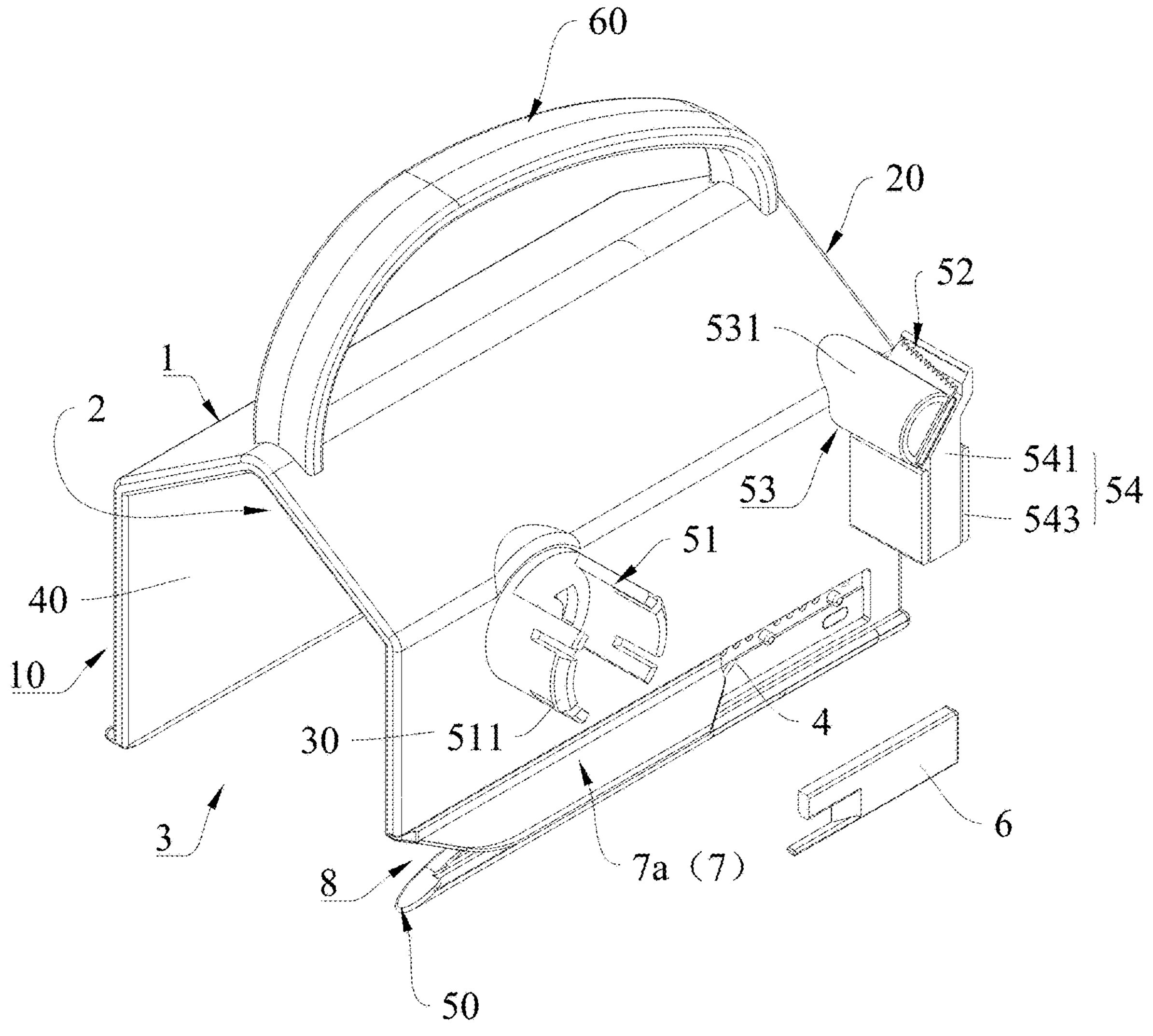
FIG. 5 is a perspective, partially exploded view of the paper cutting device in accordance with the embodiments of the present disclosure.

In some embodiments, as shown in FIG. 5, an outer end of the tape sleeve shaft 51 is provided with a convex edge 511 extending radially outward, and the convex edge 511 is configured to secure the tape roll 90 on the tape sleeve shaft 51.

In some embodiments, as shown in FIG. 5, a blade fixing member 53 is connected to the outer wall of the paper separation housing 1 and is arranged on a side the same as the tape sleeve shaft 51. The blade fixing member 53 is installed with a saw blade 52, which is configured to cut the tape 91 pulled out from the tape roll 90. A reserved part 531 is provided on one side of the blade fixing member 53 facing the tape sleeve shaft 51, and the reserved part 531 has a smooth surface for attaching a reserved part of the tape 91.

Figure 2:
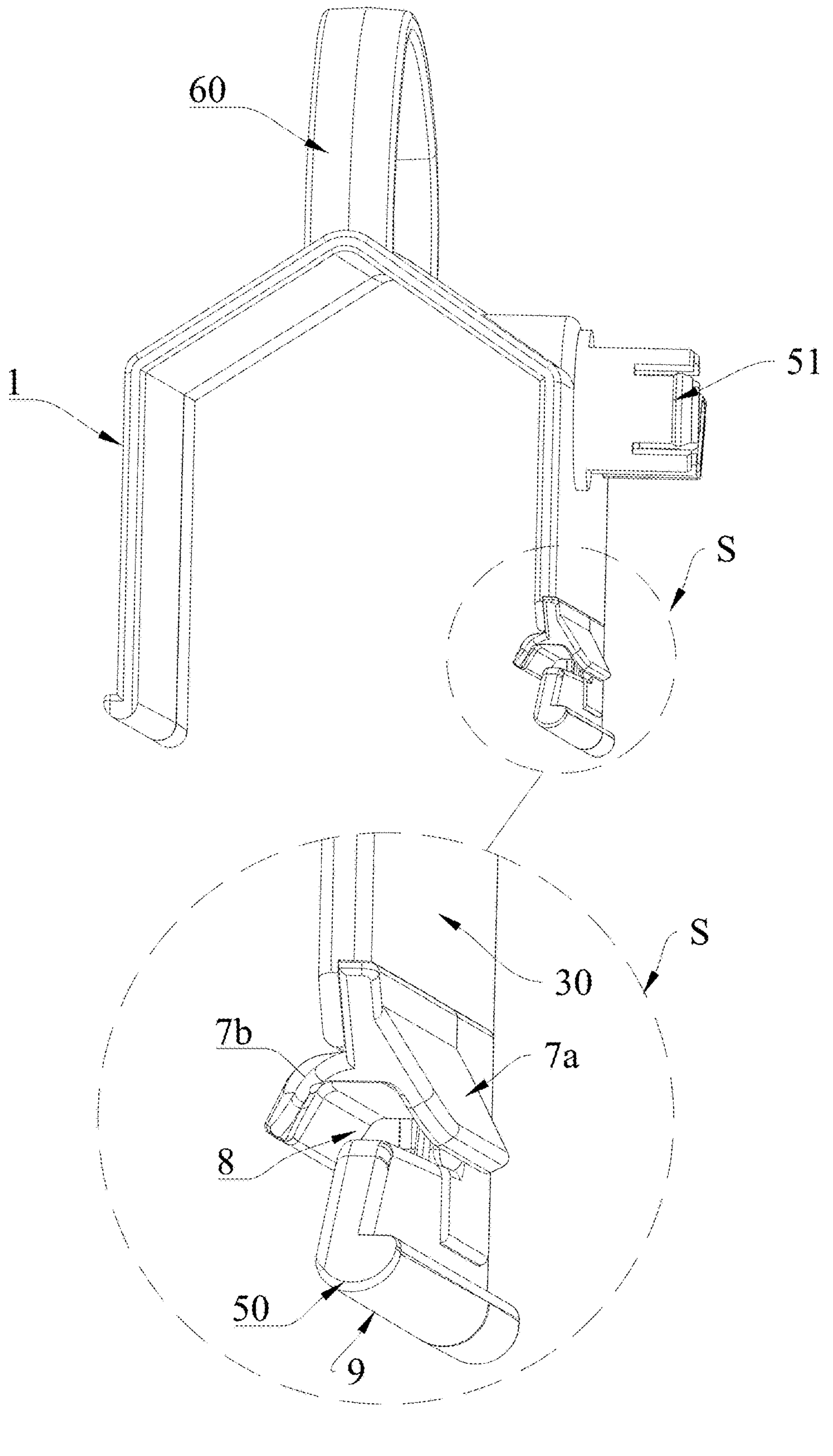
FIG. 2 is a perspective view of a paper cutting device with a tape cutting assembly and an enlarged view of area S in accordance with the embodiments of the present disclosure.
Figure 3:
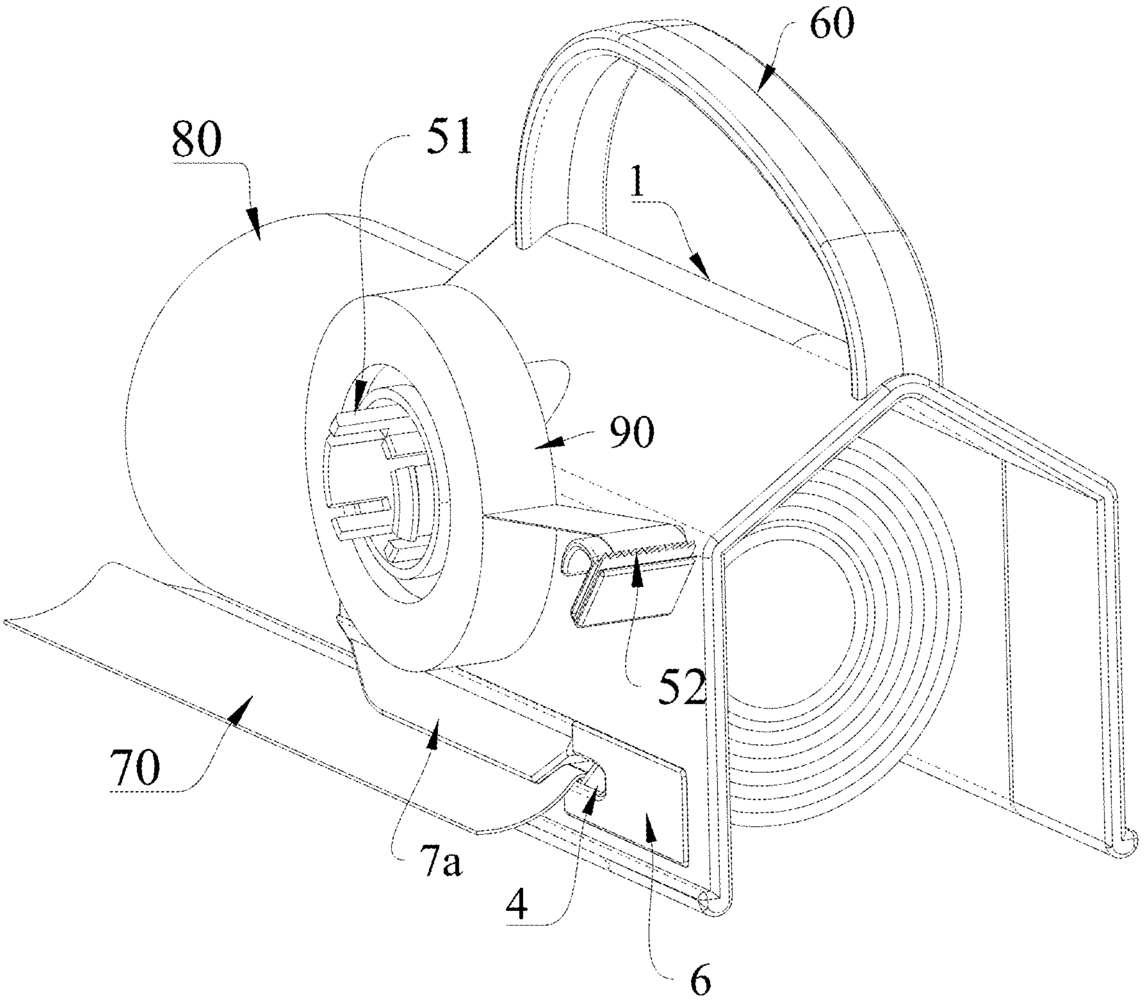
FIG. 3 is a perspective view of a paper cutting device with a tape cutting assembly cutting a paper roll in accordance with the embodiments of the present disclosure.
Figure 4:
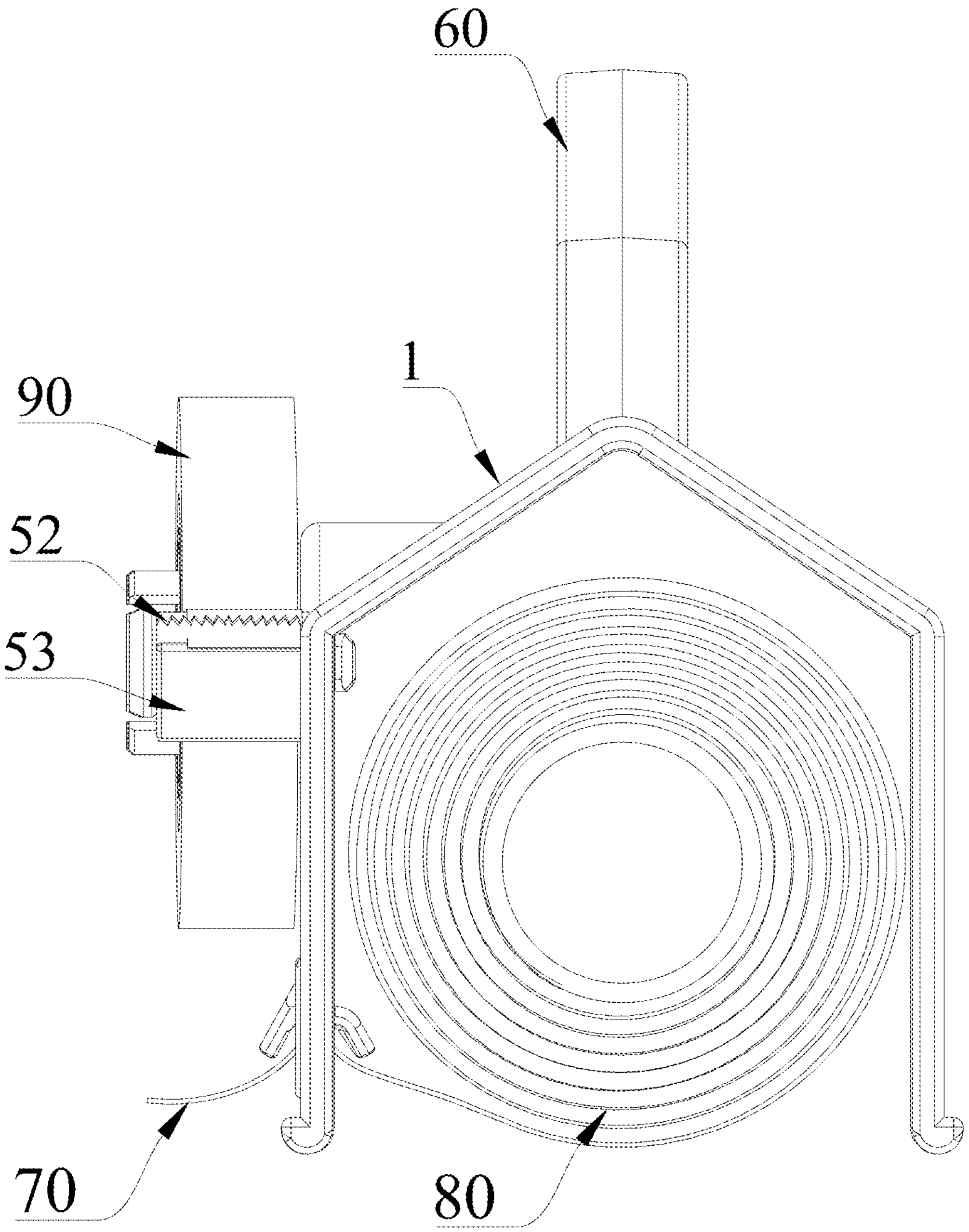
FIG. 4 is another perspective view of a paper cutting device with a tape cutting assembly cutting a paper roll in accordance with the embodiments of the present disclosure.
Figure 7:
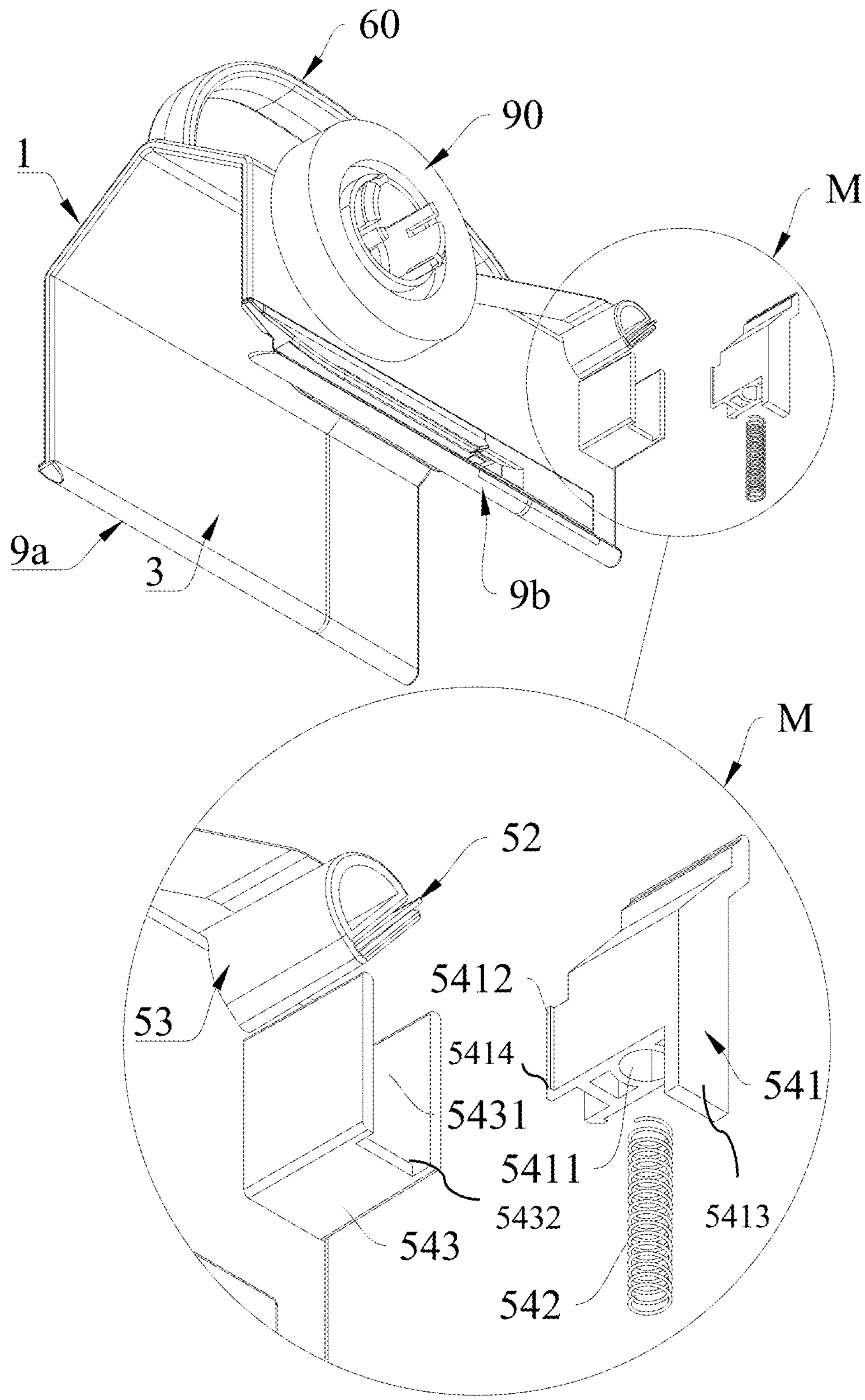
FIG. 7 is a perspective view of the paper cutting device in accordance with the embodiments of the present disclosure.

In some embodiments, as shown in FIG. 1, FIG. 2 and FIG. 7, the paper cutting device with the tape cutting assembly further includes a support structure 9, which includes a first bottom surface 9*a* and a second bottom surface 9*b*. The first bottom surface 9*a* and the second bottom surface 9*b* are located on a same plane. The first bottom surface 9*a* and the second bottom surface 9*b* of the support structure may selectively contact the paper 70 and support the paper separation housing 1, reducing the risk of shaking or displacement during operation, especially when operating on a desktop or other working surfaces. The support structure 9 ensures that the relative position of the blade 4 and the slit remains unchanged, thereby improving cutting accuracy and consistency. Compared with some linear or point contact with a support plane of a table in the related art, the first bottom surface 9*a* and the second bottom surface 9*b* significantly enhance stability. The first bottom surface 9*a* and the second bottom surface 9*b* form a large contact area to distribute pressure, reducing the risk of shaking and displacement of the device during operation, and ensuring the stability of the cutting process. The contact between the first bottom surface 9*a*, the second bottom surface 9*b*, and the paper 70 further reduces the risk of wobbling and shifting during operation, ensuring the cutting process remains stable.

In some embodiments, as shown in FIG. 1 to FIG. 13, the paper cutting device with a tape cutting assembly further includes a grip 60, which is connected to the paper separation housing 1. When the grip is applied with force, at least one component of the force is perpendicular to the bottom surface 9*a* of the supporting structure. When sliding forward, the device is effectively pressed against the supporting plane, and the device remains stable during the cutting process, reducing cutting errors caused by hand shaking or device movement, and reducing the risk of shaking and displacement of the device.

In some embodiments, the paper cutting structure further includes a blade housing 6, and the blade housing 6 and the paper separation housing 1 are an integrated one-piece structure. The integrated structure enhances the firmness and durability of the entire device and reduces the risk of loosening or deformation caused by frequent use or external force impact. The integrated structure reduces the complexity of the assembly process, reduces production costs and assembly time, and improves production efficiency.

In some embodiments, as shown in FIG. 5, the paper cutting structure further includes a blade housing 6, the blade housing 6 and the paper separation housing 1 are detachable structures, and the blade 4 is detachably connected to the paper separation housing 1. The detachable design allows the user to easily remove the blade housing 6, which is convenient for cleaning up the accumulated paper scraps, dust and other debris inside, and keeping the device clean and hygienic.

Figure 13:
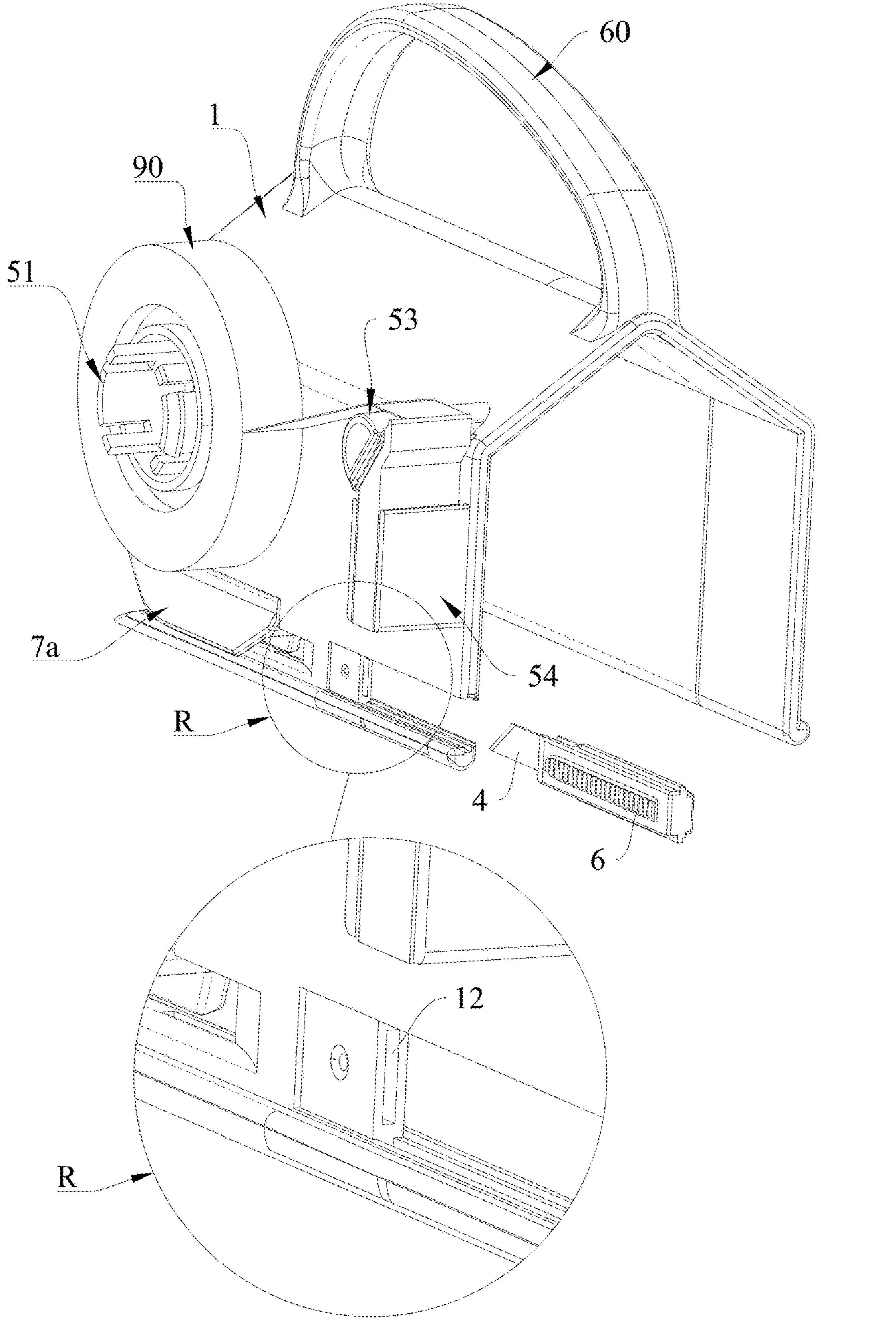
FIG. 13 is a perspective, partially exploded view showing a knife and a paper separation housing of a paper cutting device in accordance with the embodiments of the present disclosure.

In some embodiments, as shown in FIG. 13, the blade 4 and the blade housing 6 form an integrated structure, and a wall of the paper separation housing 1 is defined with a slot 12. The blade 4 and the blade housing 6 form a wallpaper knife, which may be used individually, and the wallpaper knife is inserted into the paper separation housing 1 through the slot 12. In case of the knife is damaged, a user may remove the blade housing 6 separately to replace the blade 4 without having to replace the entire device, thereby reducing maintenance costs.

Figure 6:
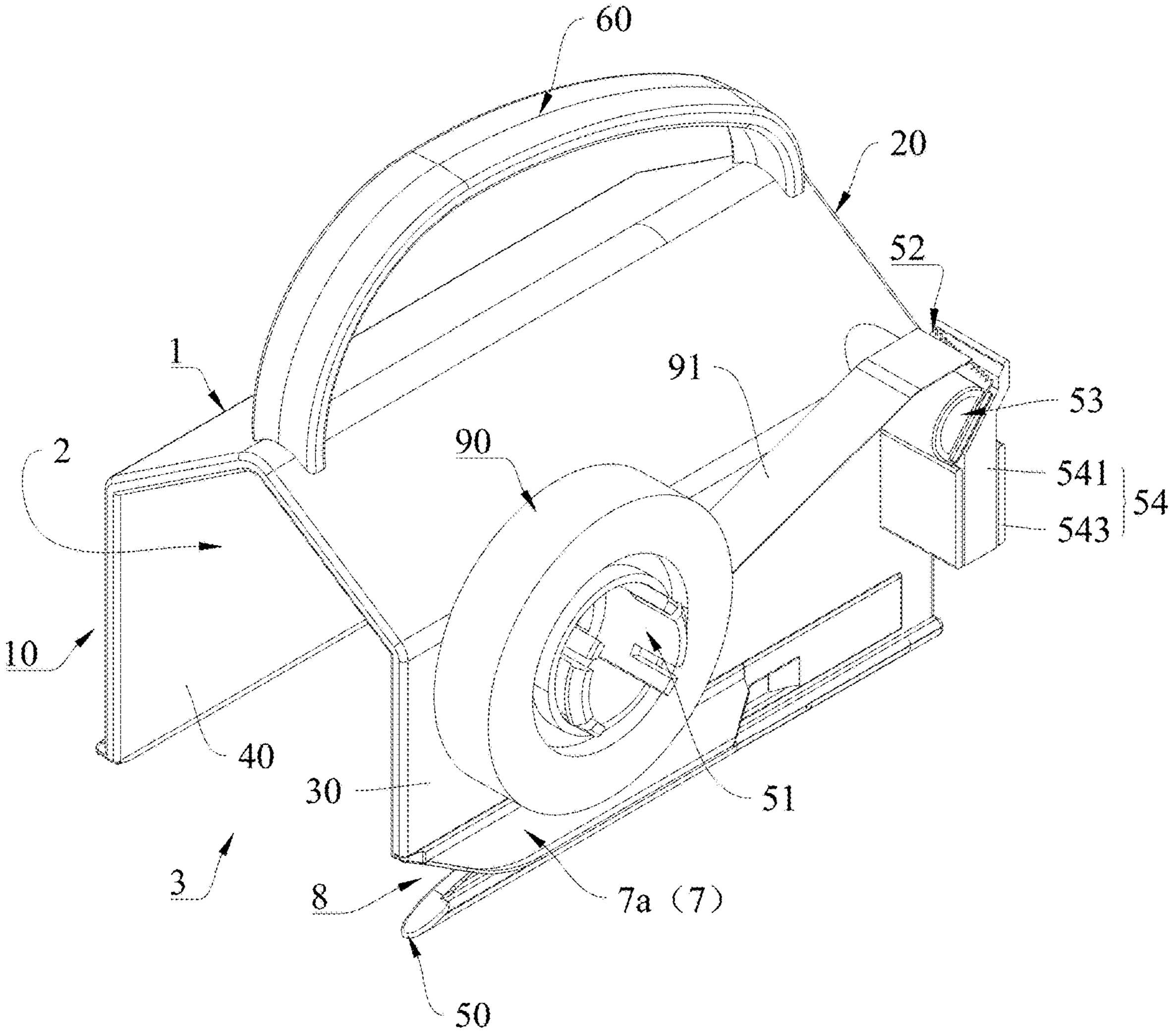
FIG. 6 is a perspective view of the paper cutting device with the cutting assembly and the protective assembly, in which a tape is installed, in accordance with the embodiments of the present disclosure.

In some embodiments, as shown in FIG. 5 and FIG. 6, the paper separation housing 1 includes a first side wall 30 and a second side wall 40 both vertically arranged, and a cavity 2 for accommodating a paper roll is formed between the first side wall 30 and the second side wall 40. The cavity 2 formed between the first side wall 30 and the second side wall 40 provides an accurate placement space for the paper roll, reduces shaking of the paper roll during use, ensures that the paper may be pulled out smoothly, and improves cutting stability and accuracy. The first side wall 30 and its side bottom edge, the second side wall 40 and its side bottom edge respectively form a paper separation structure. The paper may be effectively separated when it is pulled out, ensuring that the paper is neat and consistent each time it is cut, and improving cutting quality and efficiency. The user does not need to manually adjust the position of the paper, as the paper separation structure automatically completes the separation and guiding of the paper, simplifying the operation steps, and enhancing convenience and efficiency. The paper separation structure ensures that the paper is in the correct path and state before entering the slit, so that the blade 4 may act more intensively on the paper, enhancing cutting effect and stability.

In some embodiments, as shown in FIG. 1 and FIG. 5 to FIG. 7, the paper cutting device having the tape cutting assembly further includes a cavity opening 3, which is defined by the outer wall of the paper separation housing 1 and runs axially from the first end 10 to the second end 20. The cavity opening 3 is in communication with the cavity 2. The paper 70 of the paper roll 80 may be optionally pulled out from the cavity opening 3. The design of the cavity opening 3 allows the paper 70 of the paper roll 80 to be easily pulled out, reducing operation complexity and difficulty. Then either of the first side wall 30 or the second side wall 40 of the paper separation housing 1 may be selected for paper separation. While flattening the paper 70 through the bottom surface 9*a*, a required length of the paper may be visually checked or measured, especially when a large amount of cutting is required, reducing operation time and improving work efficiency.

In some embodiments, as shown in FIG. 2 and FIG. 6, the paper cutting structure further includes a tip 50, which is arranged on the housing below the entrance of the slit 8. The tip 50 is configured to pick up the paper from the placement surface. Whether it is thin or thick paper, the tip 50 effectively lifts it off the placement surface, ensuring that the paper 70 enters the slit 8 smoothly. This reduces entry difficulties caused by the paper adhering or sticking to the placement surface, thereby simplifying the operation and improving convenience and efficiency. The positional accuracy of the paper 70 entering the slit 8 is improved, enhancing cutting precision. The tip 50 is suitable for papers of different thicknesses and materials, increasing the device's adaptability to various paper types.

In some embodiments, as shown in FIG. 2 and FIG. 6, the tip 50 is exposed outward relative to the first end 10 of the housing. The design of the tip 50 exposed outward makes it easier to contact the paper 70 and separate it from a single sheet. Especially when the paper is placed on a flat surface, the tip 50 effectively lifts the paper 70 from the placement surface to ensure that the paper enters the slit 8 smoothly.

In some embodiments, as shown in FIG. 5 to FIG. 13, the tape cutting assembly includes a protective assembly 54. The protective assembly 54 includes a sliding member 541 and a spring mounting hole 5411 for mounting a spring 542. When an external force is applied to the sliding member 541, the sliding member 541 moves along a slide groove 11 to expose the saw blade 52. Only when the user intentionally applies an external force will the sliding member 541 move and expose the saw blade 52, thereby avoiding the risk of cutting caused by misoperation or accidental touch.

Figure 8:
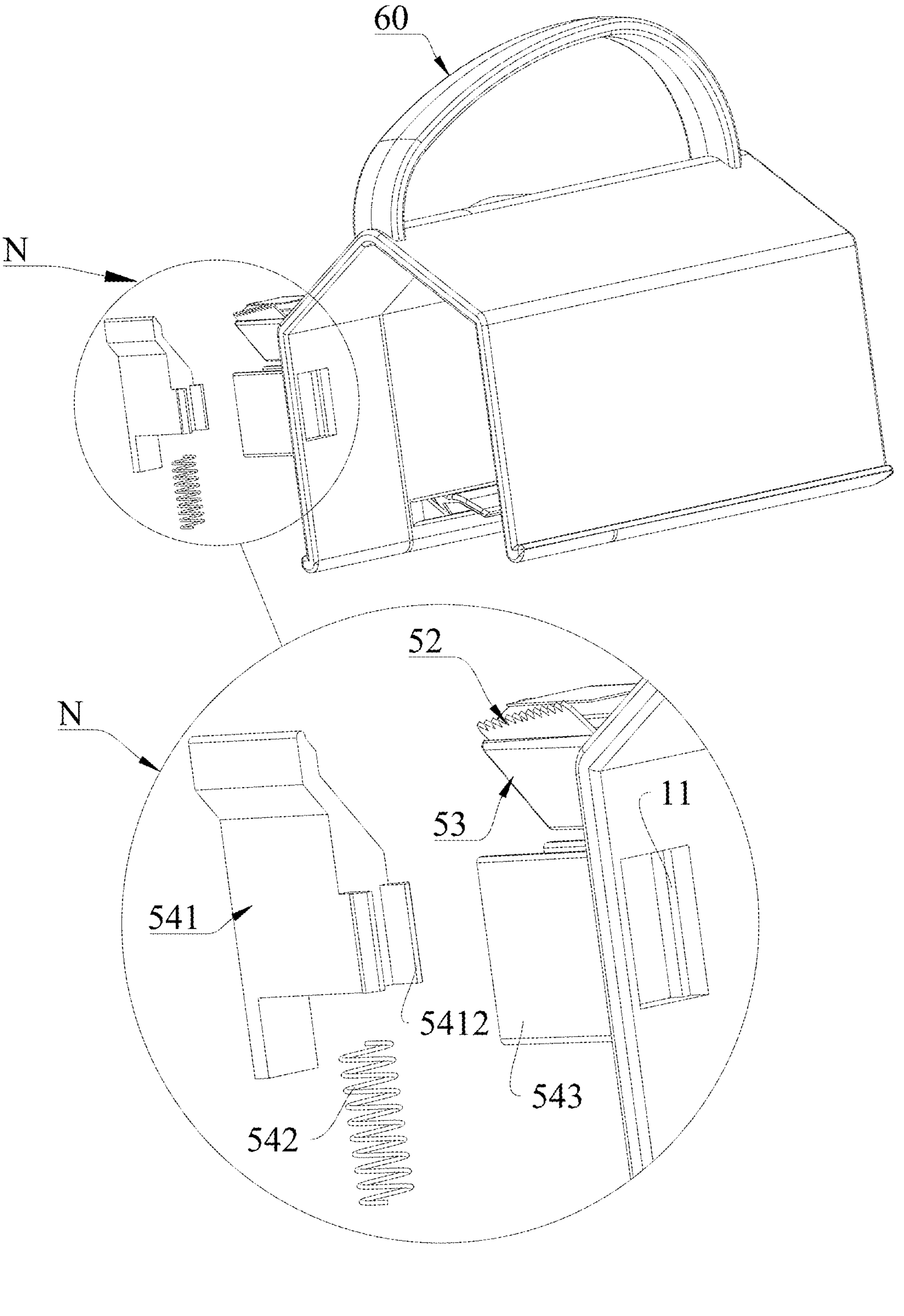
FIG. 8 is a perspective, partially exploded view of a protective assembly of the paper cutting device and an enlarged view of area M in accordance with the embodiments of the present disclosure.
Figure 12:
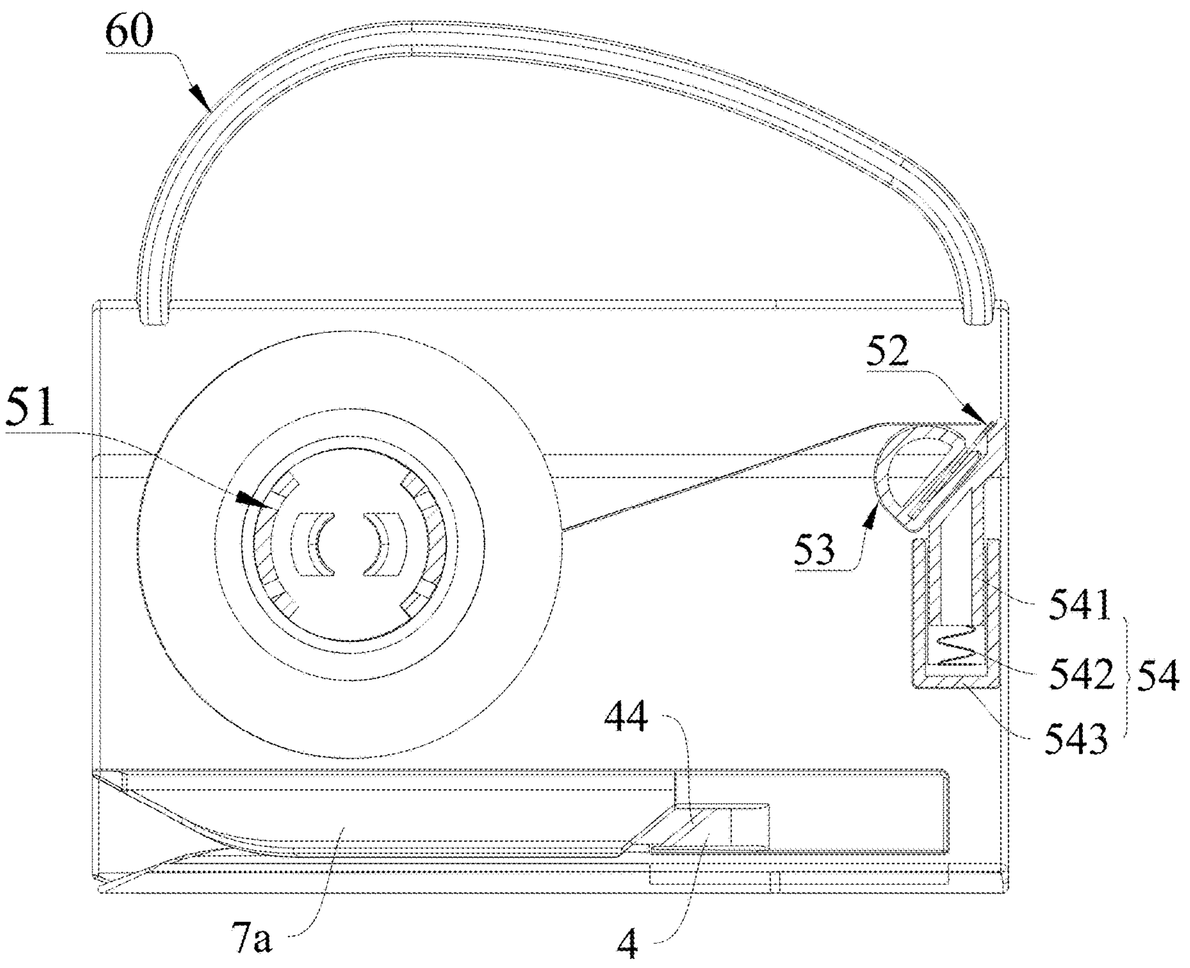
FIG. 12 is a sectional view, taken along line A-A of FIG. 11, showing an internal structure of a protective assembly.

As shown in FIG. 7, FIG. 8 and FIG. 12, the tape cutting assembly includes a spring 542. When the sliding member 541 is not applied with the external force, the spring 542 provides elastic force to push the sliding member 541 back to the initial position, and the sliding member 541 hides the blade edge of the saw blade 52. When in use, a user only needs to pull the tape 91 with one hand and press the tape 91 lightly on the sliding member 541 to complete cutting. After the tape 91 is cut, the sliding member 541 automatically resets, simplifying the operation and improves convenience and efficiency. The risk of accidental contact with the blade of the saw blade 52 is significantly reduced, and the safety during use is improved. Since the saw blade 52 is always in a hidden state when not in use, the contact between the blade and the external environment (such as dust, moisture, etc.) is reduced, the wear and aging of the blade is avoided, and the service life of the blade is extended.

Figure 9:
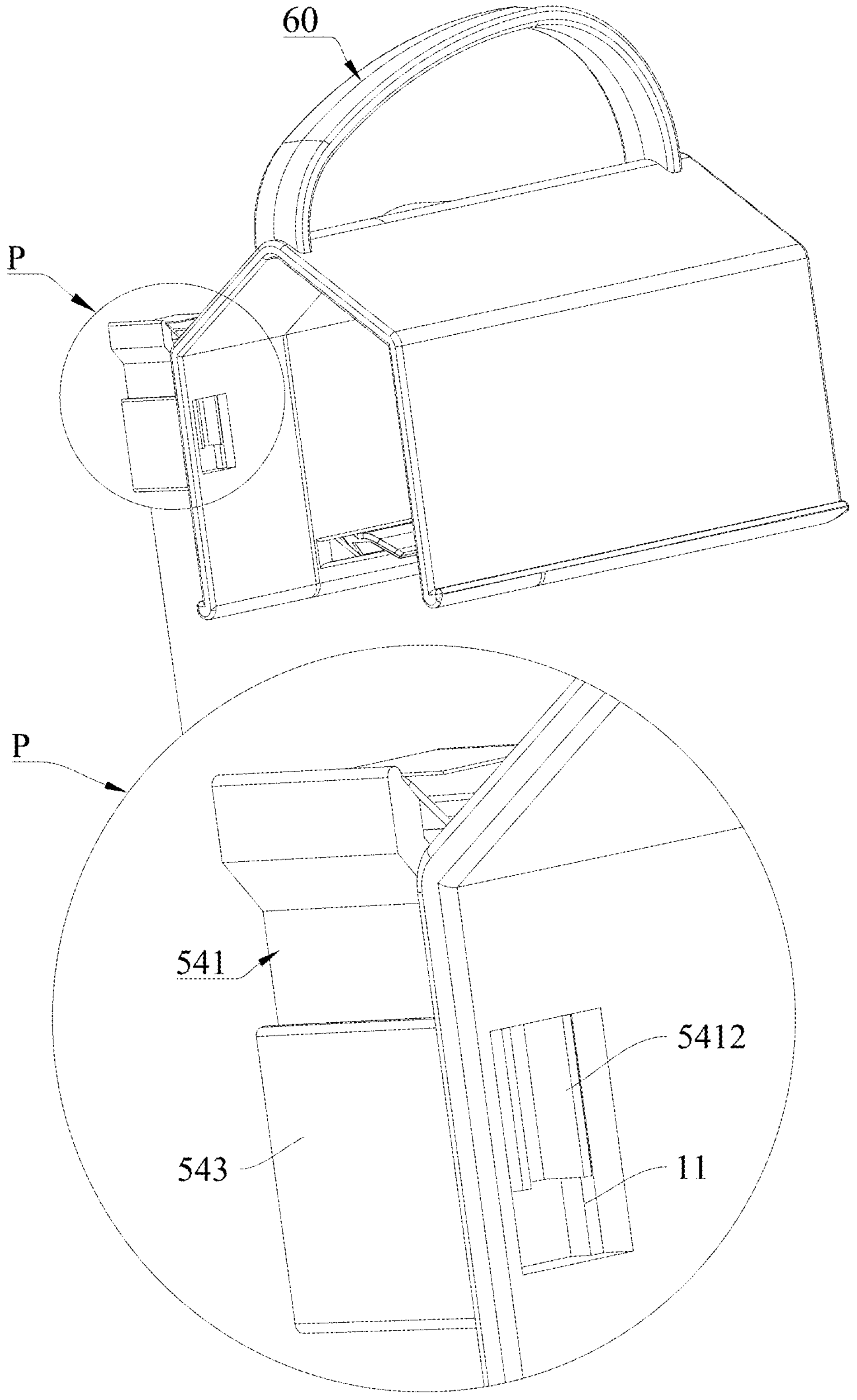
FIG. 9 is another perspective, partially exploded view of a protective assembly of the paper cutting device and an enlarged view of area P, in which the protective assembly is in a rest state, in accordance with the embodiments of the present disclosure.
Figure 10:
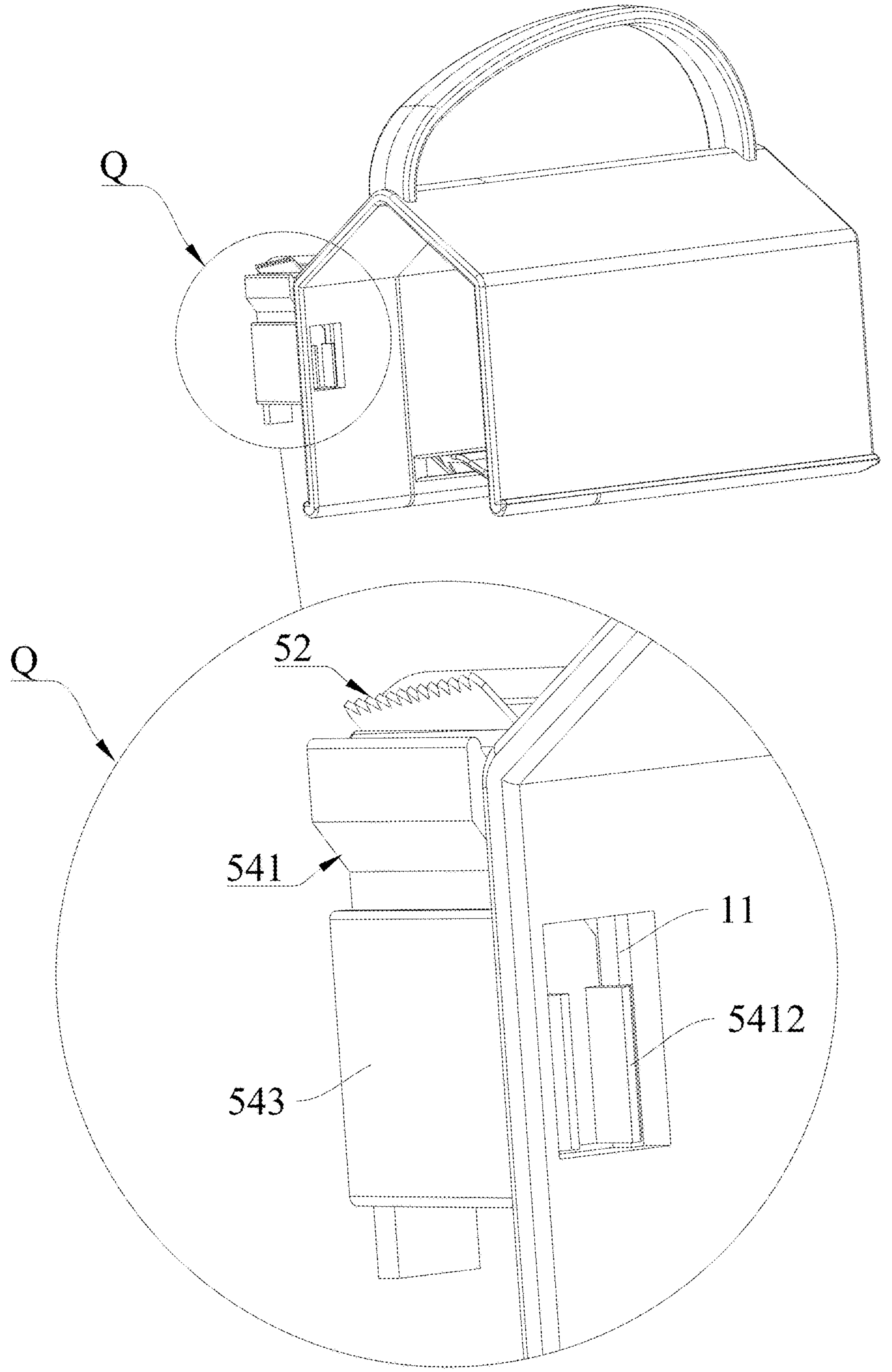
FIG. 10 is another perspective, partially exploded view of a protective assembly of the paper cutting device and an enlarged view of area Q, in which the protective assembly is in a pressed state, in accordance with the embodiments of the present disclosure.
Figure 11:
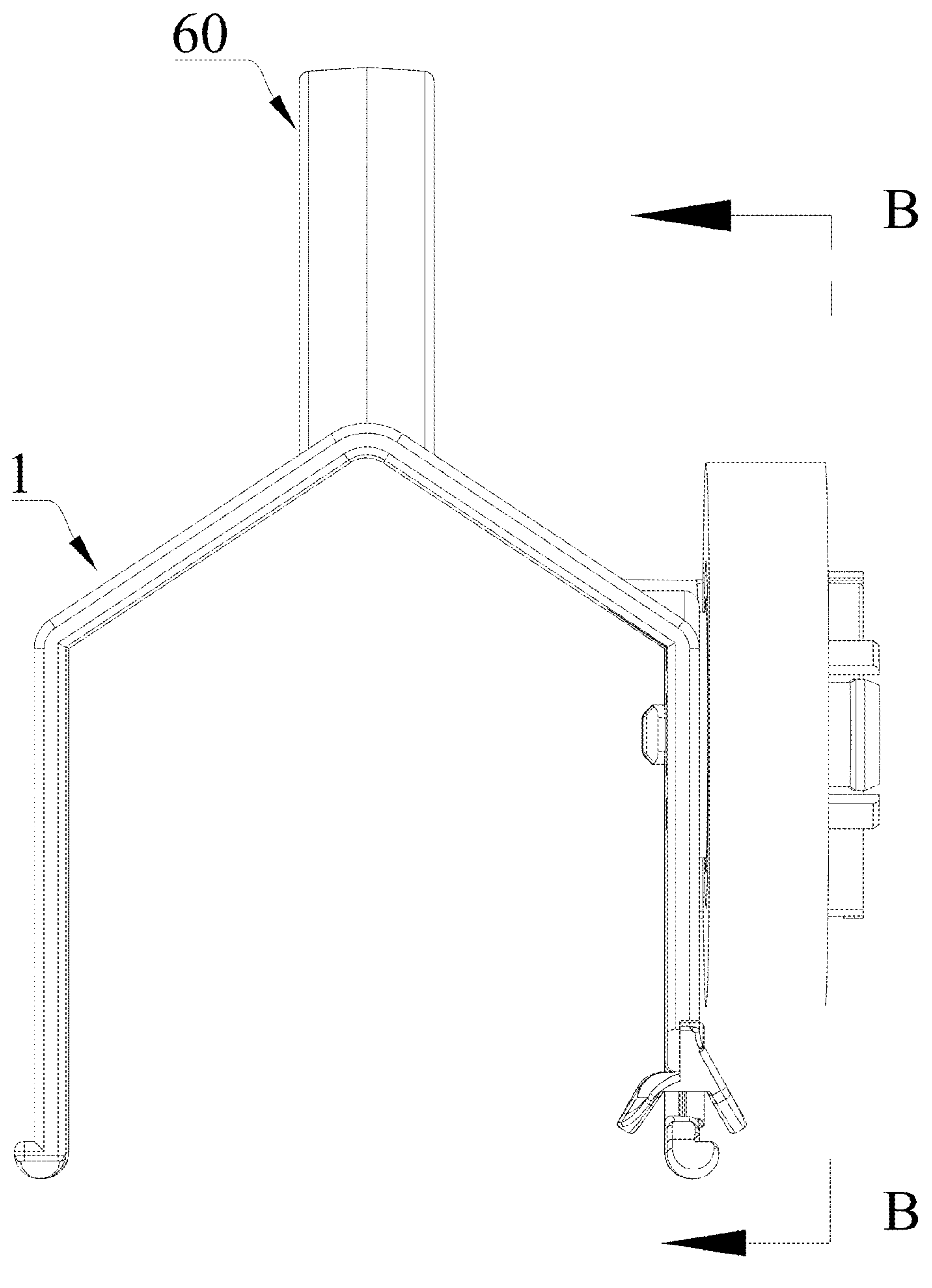
FIG. 11 is a perspective view of the paper cutting device with a tape cutting assembly in accordance with the embodiments of the present disclosure.

In some embodiments, as shown in FIG. 8 to FIG. 10, the slide groove 11 is defined by the paper separation housing 1. The sliding member 541 is provided with a slide rail 5412, the slide groove 11 matches the slide rail 5412. The slide groove 11 limits the movement range and direction of the sliding member 541, ensuring that the saw blade 52 is smoothly exposed when an external force is applied, and the slide groove 11 is accurately reset when the external force is withdrawn, thereby enhancing operation stability. The design of the slide groove 11 matching the slide rail 5412 ensures that the sliding member 541 moves along the predetermined path, reducing the occurrences of deviation or shaking. In addition, the position and angle of the blade are consistent each time the cutting is performed, and the cutting accuracy and consistency are improved.

In some embodiments, as shown in FIG. 5 to FIG. 13, the protective assembly 54 further includes a protective member 543, which constitutes an outer casing of the protective assembly 54. The protective member 543 is configured to accommodate and install the sliding member 541 and support the spring 542. The protective member 543 enhances the mechanical strength of the entire protective assembly 54 and reduces the risk of loosening or deformation caused by external impact or frequent use. The protective member 543 completely wraps the sliding member 541 and the spring 542 inside, effectively preventing external objects (such as fingers or other foreign objects) from accidentally contacting the saw blade or spring, significantly improving the safety during use. The sliding member 541 includes a side wall extension 5413, a bottom wall of the protective member 543 is provided with a notch 5432, the side wall extension 5413 abuts against an inner surface of the notch 5432 and slides in the notch 5432. The sliding rail 5412 includes a protrusion 5414, the protrusion 5414 abuts against an inner surface of the side wall of the paper separation housing.

From the above description, the working principles of the paper cutting in the above-mentioned embodiments of the present disclosure are as follows. Place the paper roll 80 in the cavity 2 of the paper separation housing 1, and fix and support the paper roll 80 through the first side wall 30 and its first bottom surface 9*a* and the second side wall 40 and its second bottom surface 9*b*. Pull out the paper 70 from the cavity opening 3 defined by the outer wall of the paper separation housing 1. The user may choose to separate the paper from the first side wall 30 or the second side wall 40, and determine the required length by visual inspection or actual measurement as needed. Use the tip 50 arranged below the entrance of the slit 8 to pick up the paper 70 from the placement surface to allow the paper 70 to enter the slit 8 smoothly. The tip 50 is exposed outward relative to the first end 10 of the housing for easy operation. After the paper 70 enters the slit 8, the outer paper pressing plate 7*a* and the inner paper pressing plate 7*b* respectively assist in positioning and pressing the paper from the inner and outer sides to ensure that the paper remains flat and stable and prevents deviation. After the paper 70 is introduced into the slit 8, the blade 4 cuts the paper. The blade 4 is arranged in the slit 8 and mounted on the housing to ensure that the position is consistent each time the cutting is performed, and to provide a stable cutting force. Since the paper is bent downward by the paper pressing plate 7, the stiffness and tension of the paper are increased, making the cutting smoother and more precise.

From the above description, the working principles of the cutting tape assembly of the above-mentioned embodiments of the present disclosure are as follows. Sleeve the tape roll 90 on the tape sleeve shaft 51, and the tape sleeve shaft 51 is connected to the outer wall of the paper separation housing 1. Ensure that the tape roll 90 rotates smoothly to allow the tape 91 to be easily pulled out. Pull out an appropriate amount of tape 91 from the tape sleeve shaft 51. The user may adjust the length of the pull-out tape 91 as needed. The user applies an external force to push the sliding member 541 to move along the slide groove 11. The sliding member 541 is provided with a slide rail 5412, which matches the slide groove 11, ensuring that the sliding member 541 moves smoothly along the predetermined path to expose the saw blade 52. When the sliding member 541 is forced downward to an appropriate position, the saw blade 52 is exposed. The user may place the pulled-out tape 91 on the serrated portion of the saw blade 52 and press down the tape to complete the cutting action. When the user releases the external force on the sliding member 541, the spring 542 provides elastic force to the sliding member 541, pushing it back to the initial position, so that the blade edge 44 of the saw blade 52 is hidden again. This design ensures that the blade is always hidden when not in use, thereby improving safety.

The above description is only some embodiments of the present disclosure and is not intended to limit the scope of the present disclosure. Any equivalent changes or modifications made according to the structure, characteristics and principles described in the protection scope of the present disclosure should be included in the protection scope of the present disclosure.

What is claimed is:

1. A paper cutting device with a tape cutting assembly, comprising:

a housing: comprising a paper separation housing (1) having a first end (10) and a second end (20), the first end (10) and the second end (20) being open and axially opposed to each other, an outer wall of the paper separation housing (1) defining a cavity (2) configured to accommodate an elongated paper roll (80), the outer wall of the paper separation housing (1) extending from the first end (10) to the second end (20) and defining a length of the paper separation housing (1);

a paper cutting structure; the paper cutting structure comprising a slit (8) and a blade (4), the slit (8) being formed in a side wall of the paper separation housing (1) and extending axially from the first end (10) to the second end (20) of the paper separation housing (1), the blade (4) being arranged in the slit (8) and mounted on the housing, a paper (70) of the elongated paper roll (80) being capable of entering through the slit (8), and the blade (4) being configured to cut the paper (70) entering through the slit (8); and a tape cutting assembly, fixedly mounted on an outer wall of the housing and configured to arrange a tape roll (90) and cut a tape (91) of the tape roll (90);

the slit is bounded by an upper portion of the side wall and a lower portion of the side wall, and a free end of the lower portion of the side wall is substantially flush with the first end of the paper separation housing.

2. The paper cutting device with a tape cutting assembly according to claim 1, further comprising a paper pressing plate (7), wherein the paper pressing plate (7) is capable of assisting in positioning and pressing down the paper (70) introduced into the slit (8).

3. The paper cutting device with a tape cutting assembly according to claim 2, wherein the paper pressing plate (7) comprises an outer paper pressing plate (7*a*) and an inner paper pressing plate (7*b*) arranged on an outer side and an inner side of the paper separation housing (1) respectively; the outer paper pressing plate (7*a*) and the inner paper pressing plate (7*b*) are proximal to the slit (8) and connected to the paper separation housing (1); and the outer paper pressing plate (7*a*) and the inner paper pressing plate (7*b*) cover at least a portion of the slit (8).

4. The paper cutting device with a tape cutting assembly according to claim 1, wherein the tape cutting assembly comprises:

a tape sleeve shaft (51) connected to the outer wall of the paper separation housing (1), wherein the tape sleeve shaft (51) is optionally sleeved with the tape roll (90), and the tape sleeve shaft (51) allows the tape roll (90) to rotate smoothly so as to pull out the tape (91); and a blade fixing member (53), connected to the outer wall of the paper separation housing (1) and arranged on a side of the outer wall of the paper separation housing (1) the same as the tape sleeve shaft (51), wherein a saw blade (52) is installed on the blade fixing member (53), and the saw blade (52) is configured to cut the tape (91) pulled out from the tape roll (90).

5. The paper cutting device with a tape cutting assembly according to claim 4, wherein the tape cutting assembly further comprises a protective assembly (54), and the protective assembly (54) comprises:

a sliding member (541), wherein the sliding member (541) moves along a slide groove (11) to expose the saw blade (52) in response to the sliding member (541) being applied with an external force; and a spring (542), wherein the spring (542) provides an elastic force to push the sliding member (541) to an initial position and a blade edge of the saw blade (52) is hidden in response to the sliding member (541) being released with the external force.

6. The paper cutting device with a tape cutting assembly according to claim 5, wherein the sliding member (541) is defined with a spring mounting hole (5411) for mounting the spring (542).

7. The paper cutting device with a tape cutting assembly according to claim 5, wherein the paper separation housing (1) is provided with the slide groove (11), the sliding member (541) is provided with a slide rail (5412), the slide groove (11) matches the slide rail (5412), and the slide groove (11) limits a movement range and direction of the sliding member (541).

8. The paper cutting device with a tape cutting assembly according to claim 7, wherein the sliding member comprises a side wall extension, a bottom wall of the protective member is provided with a notch, the side wall extension abuts against an inner surface of the notch and slides in the notch; the sliding rail comprises a protrusion, the protrusion abuts against an inner surface of the side wall of the paper separation housing.

9. The paper cutting device with a tape cutting assembly according to claim 5, wherein the protective assembly (54) further comprises a protective member (543), the protective member (543) constitutes a portion of the protective assembly (54), and the protective member (543) is configured to accommodate the sliding member (541) and support the spring (542).

10. The paper cutting device with a tape cutting assembly according to claim 4, wherein, one side, facing the tape sleeve shaft (51), of the blade fixing member (53) is provided with a reserved part (531), and the reserved part (531) is configured to attach a reserved portion of the tape (91).

11. The paper cutting device with a tape cutting assembly according to claim 4, wherein an outer end of the tape sleeve shaft (51) is provided with a convex edge (511) extending radially outward, and the convex edge (511) is configured to secure the tape roll (90) on the tape sleeve shaft (51).

12. The paper cutting device with a tape cutting assembly according to claim 1, further comprising a support structure (9) having a first bottom surface (9*a*) and a second bottom surface (9*b*), wherein each of the first bottom surface (9*a*) and the second bottom surface (9*b*) is configured to contact the paper (70) and support the paper separation housing (1).

13. The paper cutting device with a tape cutting assembly according to claim 12, further comprising a grip (60) connected to the paper separation housing (1), wherein when a force is applied to the grip (60), at least one component of the force is perpendicular to the first bottom surface (9*a*) of the support structure.

14. The paper cutting device with a tape cutting assembly according to claim 1, wherein the paper cutting structure further comprises a blade housing (6), and the blade housing (6) and the paper separation housing (1) are an integrated one-piece structure.

15. The paper cutting device with a tape cutting assembly according to claim 1, wherein the paper cutting structure further comprises a blade housing (6); and the blade (4), the blade housing (6) and the paper separation housing (1) are detachable structures.

16. The paper cutting device with a tape cutting assembly according to claim 1, further comprising a cavity opening (3) arranged on the outer wall of the paper separation housing (1) and running axially from the first end (10) to the second end (20), wherein the cavity opening (3) is in communication with the cavity (2), the paper (70) is capable of being selectively pulled out from the cavity opening (3).

17. The paper cutting device with a tape cutting assembly according to claim 16, wherein the paper separation housing (1) comprises a first side wall (30) and a second side wall (40), the cavity (2) for accommodating the paper roll (90) is formed between the first side wall (30) and the second side wall (40), the first side wall (30) and a side bottom edge of the first side wall (30) form a paper separation structure, and the second side wall (40) and a side bottom edge of the second side wall (40) form another paper separation structure.

18. The paper cutting device with a tape cutting assembly according to claim 1, wherein the paper cutting structure further comprises a tip (50) arranged on the housing below an entrance of the slit (8), and the tip (50) is configured to pick up the paper (70) from a placement surface.

19. The paper cutting device with a tape cutting assembly according to claim 18, wherein the tip (50) is exposed outward relative to the first end (10) of the housing.

20. A paper cutting device with a tape cutting assembly, comprising:

a housing: comprising a paper separation housing (1) having a first end (10) and a second end (20), the first end (10) and the second end (20) being open and axially opposed to each other, an outer wall of the paper separation housing (1) defining a cavity (2) configured to accommodate an elongated paper roll (80), the outer wall of the paper separation housing (1) extending from the first end (10) to the second end (20) and defining a length of the paper separation housing (1);

a paper cutting structure; the paper cutting structure comprising a slit (8) and a blade (4), the slit (8) being formed in a side wall of the paper separation housing (1) and extending axially from the first end (10) to the second end (20) of the paper separation housing (1), the blade (4) being arranged in the slit (8) and mounted on the housing, a paper (70) of the elongated paper roll (80) being capable of entering through the slit (8), and the blade (4) being configured to cut the paper (70) entering through the slit (8); and a tape cutting assembly, fixedly mounted on an outer wall of the housing and configured to arrange a tape roll (90) and cut a tape (91) of the tape roll (90);

wherein the paper separation housing (1) comprises a first side wall (30) and a second side wall (40); edges of free ends of the first side wall (30) and the second side wall (40) are parallel to a length direction of the paper separation housing (1) and in a plane perpendicular to the first side wall (30) or the second side wall (40).

* * * * *